March 12, 1929.     F. S. FLOETER     1,704,702

WORK CLAMPING DEVICE FOR POT CHUCKS

Filed Aug. 9, 1926

INVENTOR
Frederick S. Floeter
BY
Geo. B. Willcox
ATTORNEY

Patented Mar. 12, 1929.

1,704,702

UNITED STATES PATENT OFFICE.

FREDERICK S. FLOETER, OF SAGINAW, MICHIGAN.

WORK-CLAMPING DEVICE FOR POT CHUCKS.

Application filed August 9, 1926. Serial No. 128,079.

This invention is an improved work-clamping device for pot chucks such as are commonly employed for mounting certain kinds of work in a lathe preparatory to turning. An example of the kind of work referred to is the turning of automobile engine crank shafts, and the type of pot chuck to which my improvement is intended to be applied is a chuck mounted on the head of the lathe spindle and adapted to rotate axially therewith, the chuck being provided with an opening to receive the end of the crank shaft or other work and clamping devices for clamping said end.

The opening in the face of the chuck is eccentric to the center of the rotation of the chuck by a distance equal to the radius of the crank, the pin of which is to be turned in the lathe.

My improvement relates particularly to a new and useful device by which the operator, after having mounted the ends of the crank shaft in the opposing chucks such as above described and according to usual crank lathe practice, can more easily and quickly clamp the sides of the crank pin cheek so that the pin to be turned will be held coaxial with the lathe centers.

Heretofore it has been common to provide such a chuck with two oppositely directed adjusting screws on its face. The operator first mounted the ends of the crank shaft in the pot chuck openings as above described, and then, in order to clamp the crank cheeks securely to the pot chuck, so as to make the axis of the crank pin coincident with the axis of the lathe, he first advanced or retracted one of the adjusting screws on the face of the pot chuck against one side of the crank cheek until the lathe had been swung to such a position as to bring the axis of the crank pin coincident with the axis of the lathe, and then by tightening the other adjusting screw of the pot chuck against the other side of the crank cheek he clamped the cheek rigidly in its correct position. However, the two adjusting screws on the face of the pot chuck, as heretofore constructed, extended in directions diametrically opposite, so that after adjusting the first screw as above described the operator had to roll or turn the chuck and the work by hand or power through approximately a half revolution to enable him to reach the head of the second or clamping screw to tighten it.

In my improvement I avoid the necessity of rolling or turning the pot chuck in order to clamp the cheek or other similar piece of work. I place both of the adjusting screws on the same side of the pot chuck, thus making it unnecessary for the operator to move the chuck after he has made the first positioning adjustment by means of the first screw. He has merely to shift his tightening wrench to the second screw just alongside the first, and clamp the work without moving the chuck.

The means by which I accomplish this result is shown in the accompanying drawings, in which Fig. 1 is a perspective view of the chuck embodying my improvement.

Figures 2, 3:
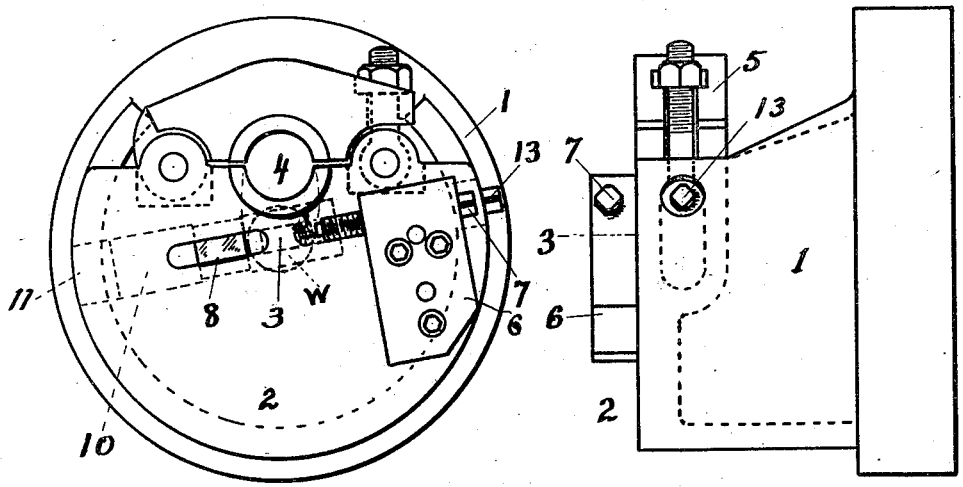
Fig. 2 is a face view.
Fig. 3 is a side view.
Figure 4:
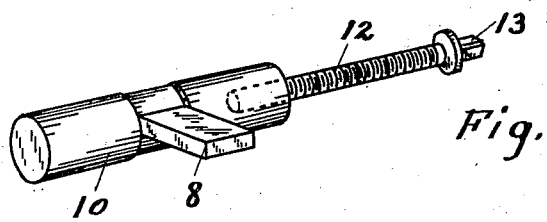
Fig. 4 is a perspective detail of the adjusting lug and its actuating screw.
Figure 1:
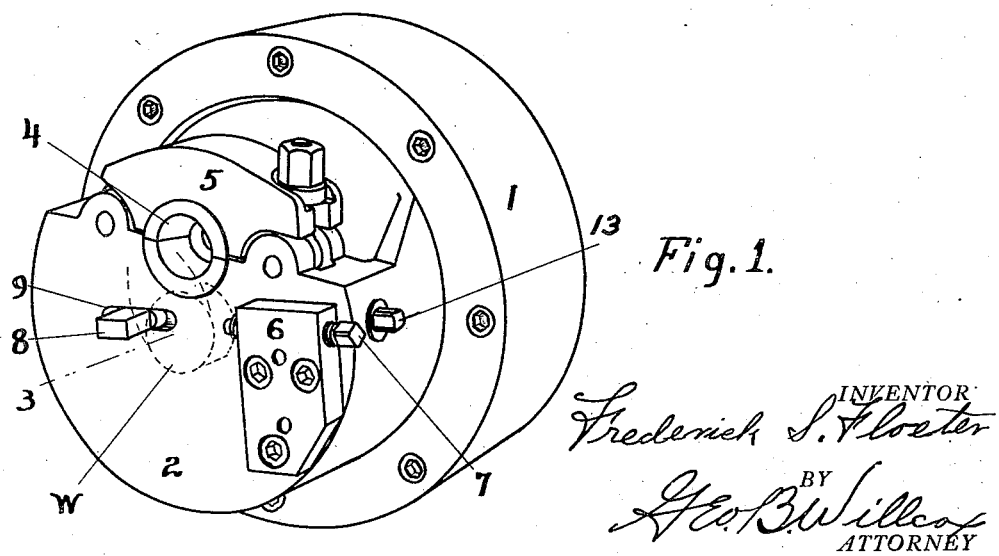

As is clearly shown in the drawings, 1 is the body of the chuck having the usual flat face 2. The axis of rotation of the chuck is indicated at 3, and 4 designates the eccentrically located opening in the face of the chuck to receive the end of the crank shaft, as above described. The crank shaft end is clamped in place by means of the usual pot chuck cap 5.

Numeral 6 indicates the usual lug on the face of the chuck, and 7 the adjusting screw mounted therein for adjusting the position of the work W with respect to the lathe axis 3.

As has been stated, it has been customary heretofore to provide two such lugs and their adjusting screws and to adjust the work by one of them, employing the other as a clamping device. It has also been explained why it has been necessary to roll or turn the chuck and the work through a half revolution in order that the operator may conveniently reach the second or clamping screw.

To shorten the time required for this clamping operation and to insure accurate and rapid work I dispense with the usual second clamping screw on the opposite side and in its place employ the device which forms the claimed subject-matter of this invention.

I provide a lug 8 that projects outwardly through a slot 9 and is capable of movement radially toward and away from the center of the face 2. The lug 8 is carried by a slidable bar or shuttle 10 which is longitudinally movable in a suitable guideway or bore 11 of the pot chuck face 2. The shuttle 10 can be moved back and forth by means of an adjusting screw 12 threaded in its end, the head by which the screw is operated being shown at 13, alongside the other adjusting screw 7.

In practice, the operator positions the crank cheek or other work W by means of the screw 13, the shuttle, and its lug 8 and then, without rolling or turning the chuck 1 he clamps the work W tight against the lug by means of screw 7.

By the means above described I have produced a simple and inexpensive device by which work of the character described can be quickly and accurately mounted in a lathe and the cheek or other projecting part of the work can be easily and quickly swung to its proper position with relation to the lathe axis and thereby clamped without requiring the operator to move from his position or to turn either the work or the chucks. A considerable saving of time and effort is thereby made, which is a material item in works that employ intensive production methods in manufacturing.

Having thus described my invention, what I claim and desire to secure by Letters Patent is:

The combination of a pot chuck having a work positioning lug projecting from the face thereof, lug-actuating means comprising a shuttle member slidable in said chuck, an adjusting screw operatively engaging said shuttle member, the head of said screw located at the periphery of the chuck, an independently operated work-clamping screw mounted on the face of the chuck parallel with said adjusting screw and having its head located alongside the head of said adjusting screw whereby adjustment and clamping of the work are both done from the same side of the chuck and without rotation thereof.

In testimony whereof, I affix my signature.

FREDERICK S. FLOETER.